United States Patent [19]
Mundt et al.

[11] Patent Number: 5,666,263
[45] Date of Patent: Sep. 9, 1997

[54] ATTACHING A SPEAKER TO A COMPUTER COMPONENT

[75] Inventors: Kevin W. Mundt, Spring; George K. Korinsky, The Woodlands; William R. Dorr, Houston, all of Tex.

[73] Assignee: COMPAQ Computer Corporation, Houston, Tex.

[21] Appl. No.: 514,110

[22] Filed: Aug. 11, 1995

[51] Int. Cl.⁶ .................................................... H05K 7/14
[52] U.S. Cl. ........................ 361/683; 361/682; 248/918
[58] Field of Search ................................. 361/683–686, 361/681, 682; 312/223.1, 223.2; 348/836, 838, 839; 364/708.1; 248/918, 309.1

[56] References Cited

U.S. PATENT DOCUMENTS

| | | | |
|---|---|---|---|
| 5,190,258 | 3/1993 | Yu | 248/279 |
| 5,519,572 | 5/1996 | Luo | 361/685 |

OTHER PUBLICATIONS

Sony Trinitron Color TV KV-20XBR/25XBR operators manual, copyright 1984 1984.
Packard Bell, Integrated Speakers Installation Guide (Date unknown).
Packard Bell, 1511SL Color Monitor User's Manual (Date unknown).

*Primary Examiner*—Leo P. Picard
*Assistant Examiner*—Lynn D. Feild
*Attorney, Agent, or Firm*—Fish & Richardson P.C.

[57] ABSTRACT

A coupling is configured to hold detachably a speaker on a computer component by a gravitational force acting on the speaker. The coupling may be a pocket on the component and a flange on the speaker. The coupling may include vertically aligned projecting elements on the component and corresponding receptacles on the speaker. The coupling may be hidden after the speaker has been mounted. To attach the speaker it is held near the component and then lowered with respect to the coupling mechanism to reach a position where the speaker is fixed relative to the component by a gravitational force.

31 Claims, 6 Drawing Sheets

5,666,263

ATTACHING A SPEAKER TO A COMPUTER COMPONENT

BACKGROUND

This invention relates to attaching a speaker to a computer component.

Speakers used in multi-media computer systems, for example, are sometimes attached to the monitor of such systems.

SUMMARY

In general, in one aspect, the invention features the combination of a computer component, a speaker, and a coupling configured to hold detachably the speaker on the component by a gravitational force acting on the speaker.

Implementations of the invention may include one or more of the following features. The coupling may be a member integral to a plastic housing of the speaker, and/or a member integral to a plastic housing of the component. The coupling may be a projecting element having a base and an end positioned above the base, the projecting element being disposed at an acute angle to vertical. The coupling may include a receptacle having an opening and a terminus positioned above the opening, the receptacle being disposed at an acute angle to vertical. There may be multiple projecting elements and multiple receptacles, vertically aligned. There may be a pair of such speakers coupled detachably to respectively opposite sides of the component. The component may be a monitor. A resilient bumper may be disposed between the speaker and the component in a recess in the speaker or in the component. The computer component may include a pocket and the speaker may include a flange configured to couple releasably to the pocket. The coupling may be hidden from view after the speaker has been attached to the component. The speaker may have a medial surface configured reciprocally to a lateral surface of the component. The monitor may have bezelled and flat surfaces. The speaker may have arcuate and straight surfaces. The speaker may be coupled to the component at an intersection of the bezelled and flat surfaces. The coupling may be configured to hold the speaker on the component by a gravitational force acting on the component.

In general, in another aspect, the invention features the computer component with a pocket, and the speaker with the flange.

In general, in another aspect the invention features the vertically aligned projecting elements and receptacles.

In general, in another aspect, the invention features the hidden coupling.

In general, in another aspect, the invention features a method of attaching a speaker to a computer component, in which the speaker is held near the component and the speaker is lowered with respect to a coupling mechanism associated operatively with the speaker to reach a position where the speaker is fixed relative to the component by a gravitational force.

In general, in other aspects the invention features the computer component housing with a pair of projecting elements, and the speaker housing with the pair of receptacles.

Among the advantages of the invention may be one or more of the following. Because neither tools nor additional hardware are required, the speakers may be easily attached and detached. Ease of use also results from the speakers being held in place by the force of gravity. When gravity is the primary force fixing the position of the speakers, the speakers and the computer component are less susceptible to damage during relocation of the system. A user attempting to lift the computer component by the speakers will simply disengage the speakers from the component rather than being able to use them as lifting handles. Hiding the coupling mechanism between the speaker and the computer component provides an aesthetic benefit.

Other advantages and features will become apparent from what follows.

DESCRIPTION

Figure 1:
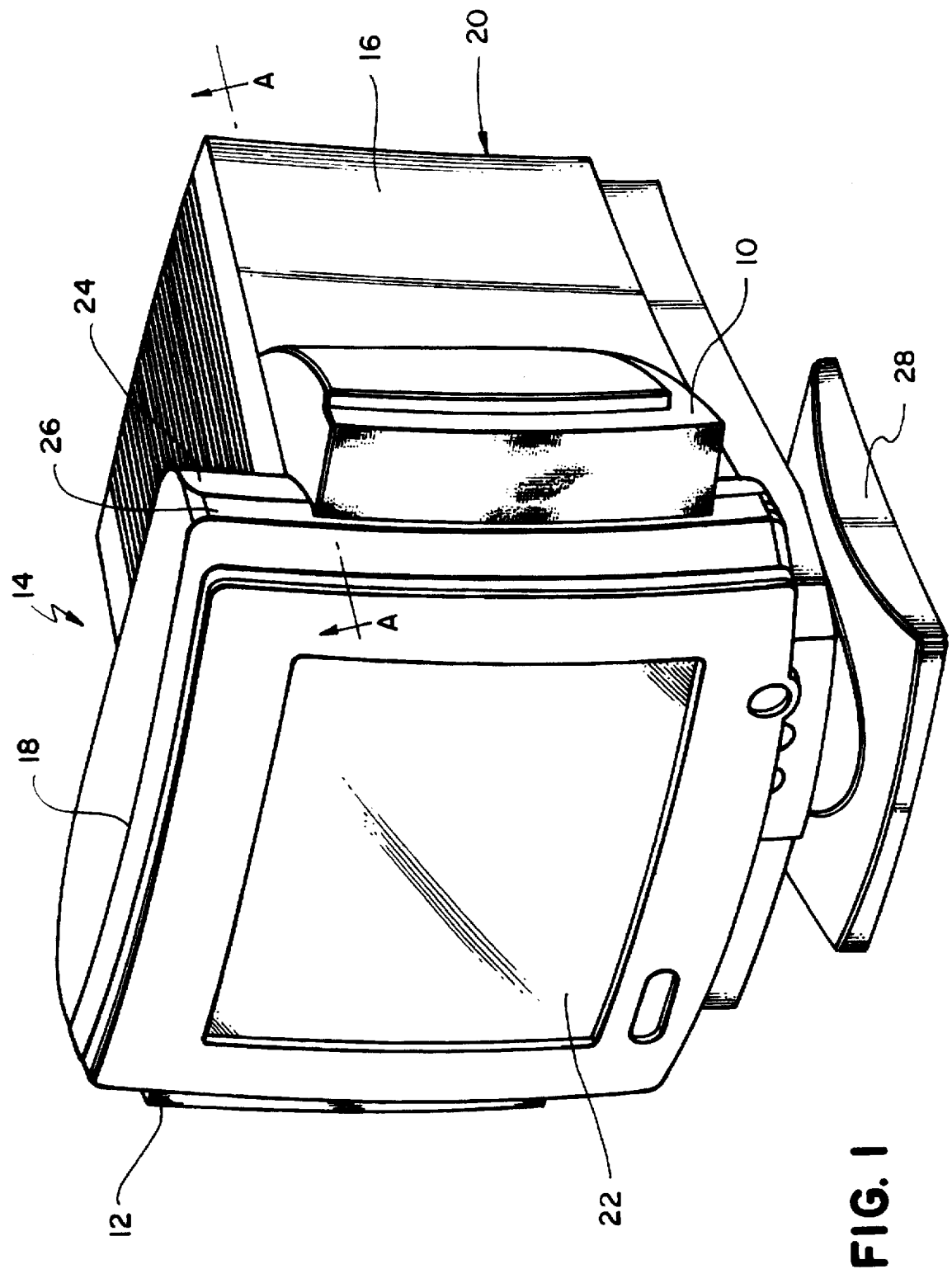
FIG. 1 is a perspective view of a removable speaker system for a computer monitor.

Referring to FIG. 1, right and left removable speakers 10, 12 are mounted detachably on computer monitor 14 at the intersection of lateral monitor surface 16 and bezel 18 of monitor bucket 20. Bezel 18 is a lateral expansion of lateral monitor surface 16 which accommodates CRT screen 22 via curved and flat bezel surfaces 24, 26. The combined system of computer monitor 14 and removable speakers 10, 12 is mounted on a tilt swivel base 28 such that a user may adjust simultaneously what is seen and heard from the computer system. Speakers 10, 12 and monitor 14 may be constructed from plastic by injection molding or from other materials.

Figure 2:
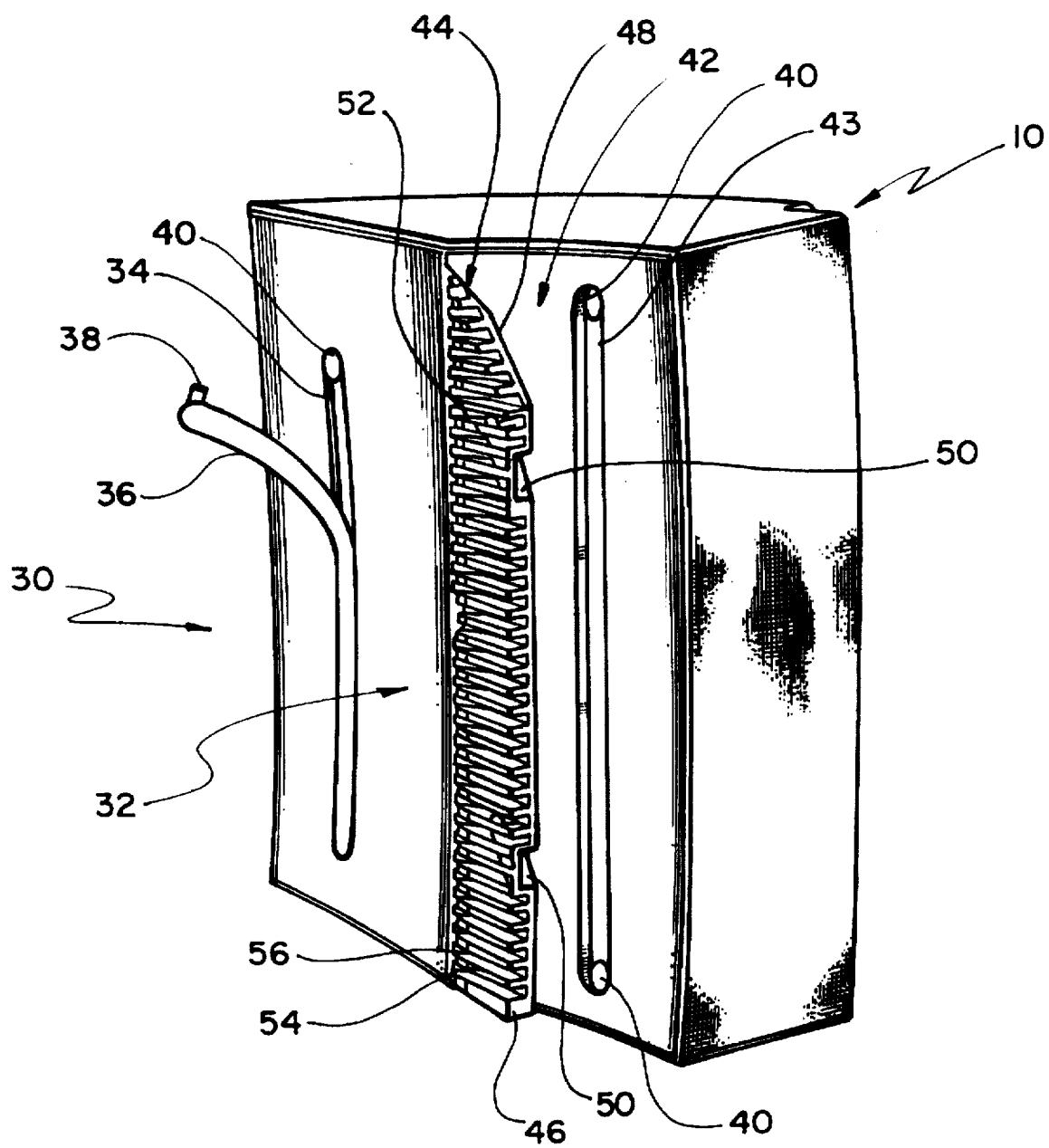
FIG. 2 is an anteriomedial view of a removable speaker.

Referring to FIG. 2, the medial surface 30 of right removable speaker 10 is contoured reciprocally to lateral monitor surface 16 and curved and flat bezel surfaces 24, 26. Flat speaker surface 32, which interfaces with lateral monitor, surface 16, contains posterior channel 34 into which resilient bumper 36 is seated. Resilient bumper 36 (shown partially retracted) is held within and projects slightly from posterior channel 34 when tabs 38 are inserted into through holes 40 (additional tab and through hole not shown). Curved speaker surface 42, which interfaces with curved and flat bezel surfaces 24, 26, includes anterior channel 43 having through holes 40 (resilient bumper of anterior channel 43 not shown). Resilient bumper 36 provides a cushion at the interface of medial speaker surface 30 with lateral monitor surface 16 and bezel 18. Flange 44 protrudes anteriorally from the intersection of flat and curved speaker surfaces 32, 42 and extends vertically from inferior edge 46 to superior edge 48. Tapered grooves 50 are aligned vertically and positioned intermediate inferior and superior edges 46, 48. Flange 44 also includes corrugated surface 52 having struts 54 interposed by slots 56.

Figure 3:
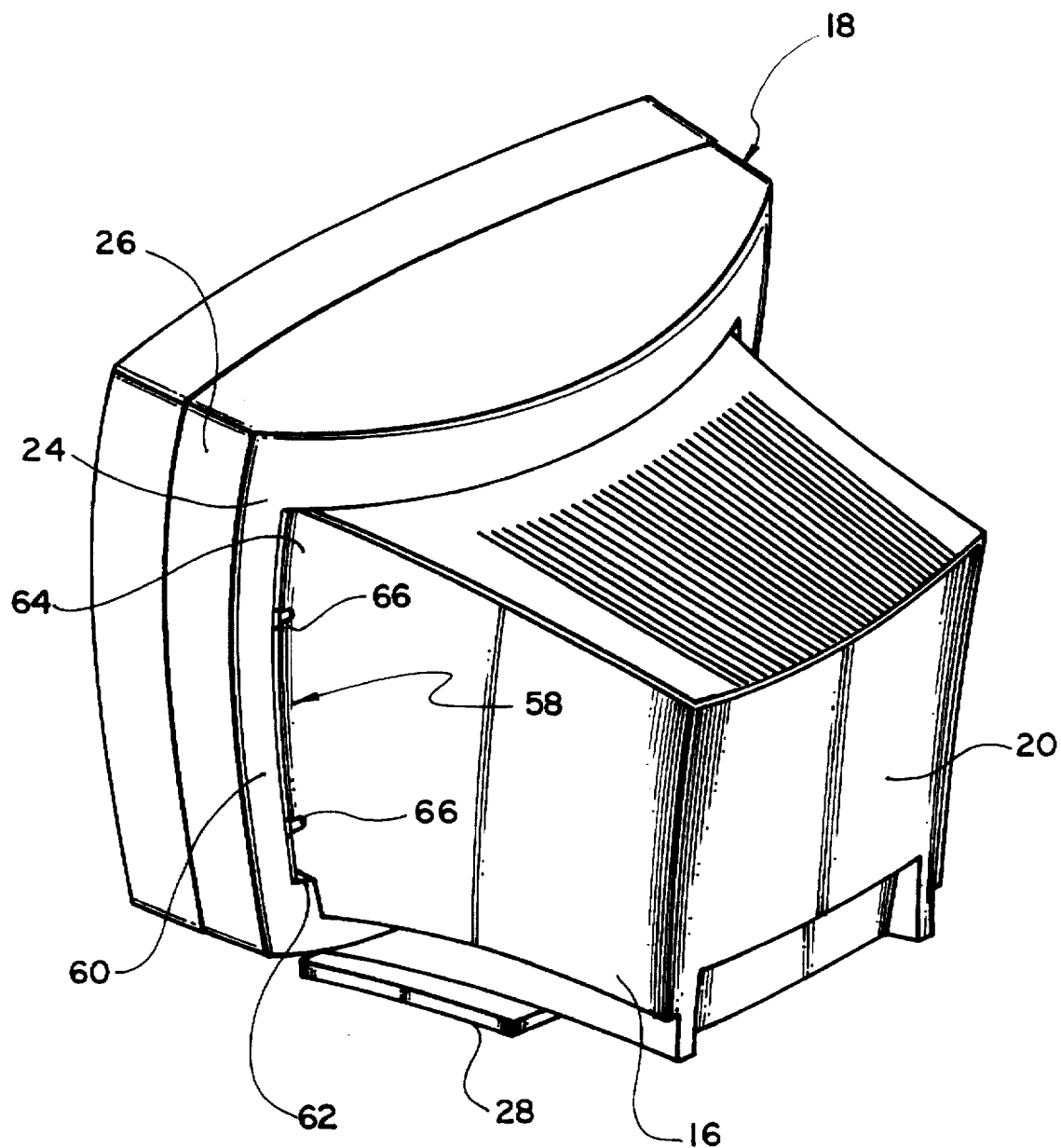
FIG. 3 is a posterolateral view of a computer monitor.

Referring to FIG. 3, pocket area 58, which interfaces with flange 44, is located at the intersection of lateral monitor surface 16 and lip 60 of curved bezel surface 24. Pocket area 58 extends vertically from inferior pocket corner 62 to superior pocket corner 64. Tapered hooks 66 are aligned vertically in pocket area 58 between inferior and superior pocket corners 62, 64. Tapered hooks 66 protrude posteriorally into pocket area 58, but do not extend beyond lip 60. Therefore, they are not visible from a lateral view of monitor bucket 20 (see FIGS. 4–5).

Figure 4:
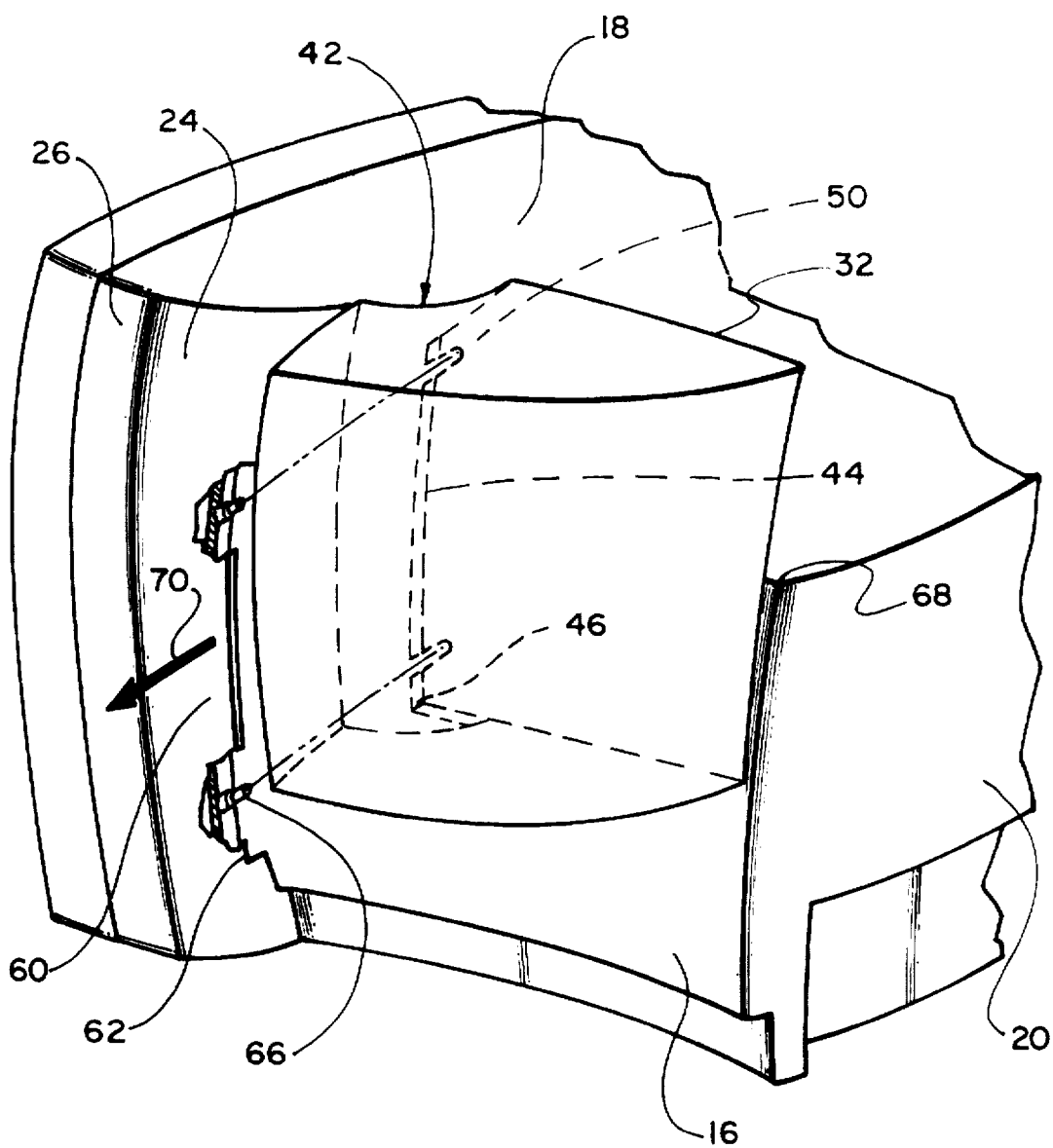
FIG. 4 is a posterolateral view of a removable speaker and a computer monitor.
Figure 5:
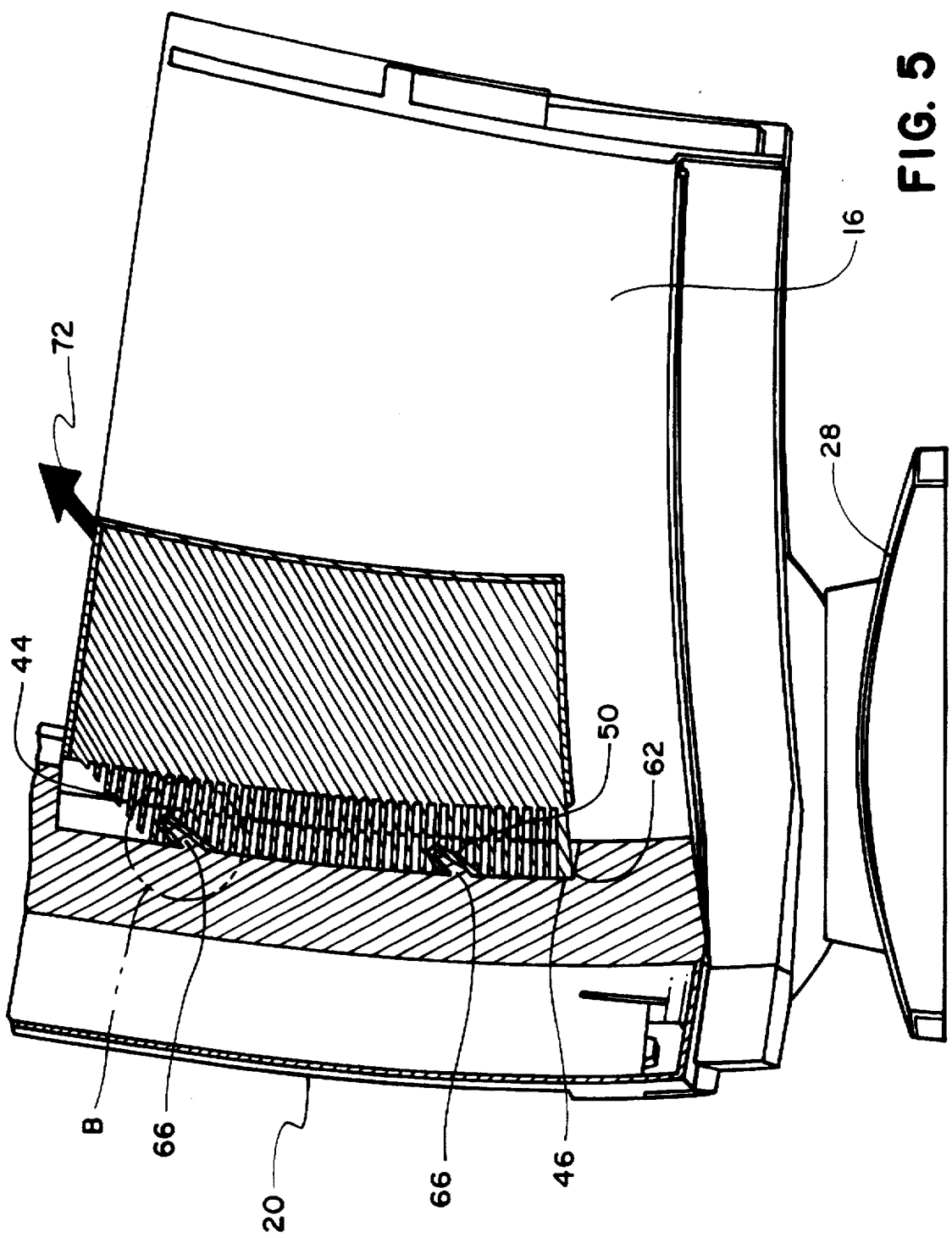
FIG. 5 is a view at A—A of FIG. 1.

Referring to FIG. 4, right removable speaker 10 is mounted on computer monitor 14 by positioning flat speaker surface 32 adjacent lateral monitor surface 16, with right removable speaker 10 held partially above and toward right posterior corner 68 of monitor bucket 20. Right removable speaker 10 is moved forward and downward in the direction of arrow 70 such that flange 44 is inserted into pocket area 58 and tapered hooks 66 engage tapered grooves 50. In addition, inferior edge 46 is positioned in inferior corner 62 (see FIG. 5). In this position, the reciprocally contoured surfaces of monitor bucket 20 and right removable speaker 10 are adjacent one another such that flat and curved speaker surfaces 32 and 34 contact lateral monitor surface 16 and curved and flat bezel surfaces 24, 26, respectively. Resilient bumpers 36 of posterior and interior channels 34, 44 are interposed between right removable speaker 10 and monitor bucket 20.

Once mounted, the position of right removable speaker 10 is fixed by the force of gravity and by friction at the interface between right removable speaker 10 and computer monitor 14. The speaker may be easily removed by lifting in the direction of arrow 72 (see FIG. 5). Thus, neither tools nor special hardware are required for attaching or detaching right removable speaker 10. In addition, speakers mounted in this manner may not be used as handles to lift the computer monitor, thereby preventing damage to the speaker and the monitor during relocation. Moreover, an aesthetic feature is achieved by hiding the coupling mechanism between the speaker and the computer monitor.

Figure 6:
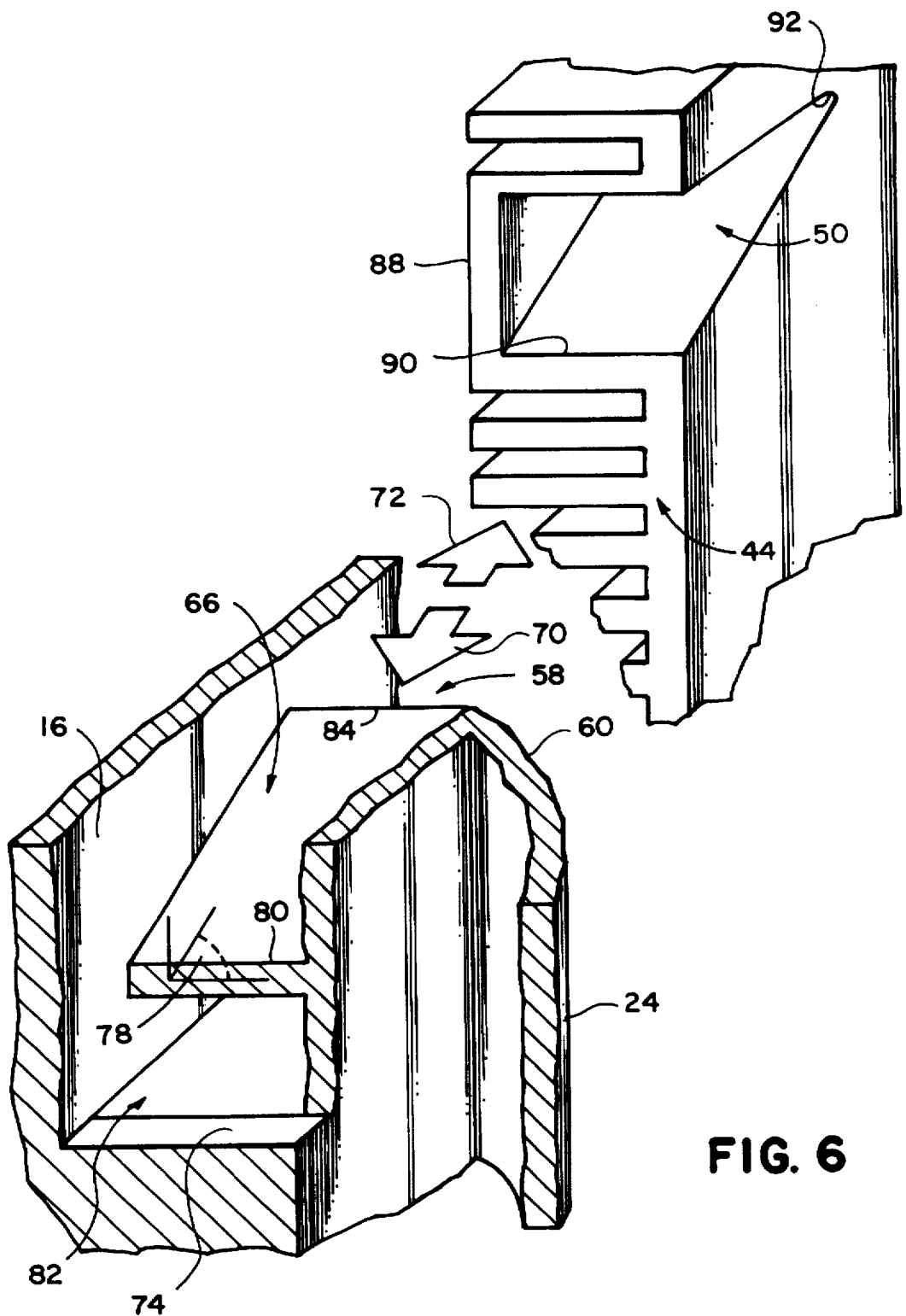
FIG. 6 is a sectional view at B of FIG. 5.

Referring to FIG. 6, pocket area 58 is bounded by lateral monitor surface 16 and curved bezel surface 24. Pocket area 58 is defined by the intersection of posterior pocket surface 74 with medial lip wall 76 of lip 60 and with lateral monitor surface 16, respectively. Tapered hook 66 protrudes posteriorly from posterior pocket surface 74 (not shown) at an acute angle to vertical 78 and projects medially from medial lip wall 16. Tapered hook 66 includes hook base 80 and tapered hook end 84. Space 82, between tapered hook 66 and lateral monitor surface 16, is occupied by medial groove wall 88. Tapered groove 50 is formed in flange 44 and defined by curved speaker surface 42 (not shown) and medial groove wall 88. Tapered groove 50 extends posteriorally between groove opening 90 and groove terminus 92 at an acute angle to vertical 78. The positioning of tapered hook 66 and tapered groove 50 at an acute angle to vertical facilitates the fixing of the position of the removable speakers by gravity. In addition, the difference in the taper of groove 50 and hook 66 facilitates their interaction such that tapered hook end 84 inserts substantially into groove terminus 92.

Other embodiments are within the scope of the following claims.

What is claimed is:

1. An apparatus, comprising:
a monitor including a housing having a bezel surrounding a face of said monitor and a smaller rear enclosure which meets a rear surface of said bezel along a vertical crease;
a speaker; and
a coupling located along said crease and having a projecting element on either said monitor or said speaker and a receiving element on the other of said monitor or said speaker, said projecting element and said receiving element being configured and disposed so that said speaker may be mounted on said monitor by mating said projecting element and said receiving element and lowering said speaker in a direction that is at an angle to vertical.

2. The apparatus of claim 1, wherein said receiving element is on said speaker.

3. The apparatus of claim 1, wherein said speaker comprises a housing and said projecting element or said receiving element is integral to said housing.

4. The apparatus of claim 3, wherein said housing comprises plastic.

5. The apparatus of claim 1, wherein said a projecting element is on said monitor.

6. The apparatus of claim 1, wherein said projecting element or said receiving element is integral to said housing of said monitor.

7. The apparatus of claim 6, wherein said housing comprises plastic.

8. The apparatus of claim 1, wherein said monitor comprises a pocket within said crease and said speaker comprises a flange configured to couple releasably to said pocket.

9. The apparatus of claim 8, wherein said coupling comprises a vertically aligned pair of said projecting elements disposed within said pocket and configured to engage a vertically aligned pair of said receptacles disposed within said flange.

10. The apparatus of claim 1, wherein said coupling is hidden from view after said speaker has been attached to said monitor.

11. The apparatus of claim 1, wherein said speaker comprises arcuate and straight surfaces complimentary to said bezel and said rear enclosure, respectively.

12. The apparatus of claim 1, wherein said coupling is configured to hold detachably said speaker on said monitor by a gravitational force acting on said speaker.

13. The apparatus of claim 1, wherein said projecting element comprises a base and an end, said end being positioned above said base.

14. The apparatus of claim 1 wherein said projecting element and said receiving element define mating surfaces which lie in vertical planes that are perpendicular to a viewing surface of said monitor and, within said vertical planes, are oriented at an angle to the vertical.

15. The apparatus of claim 1, wherein said receiving element comprises an opening and a terminus, said terminus being positioned above said opening.

16. The apparatus of claim 1, wherein said coupling comprises two projecting elements and two receiving elements.

17. The apparatus of claim 16, wherein said two projecting elements are vertically aligned and said two receiving elements are vertically aligned.

18. The apparatus of claim 1 wherein said speaker includes a front surface, and said coupling is configured so that when said speaker is mounted, said front surface of said speaker lies essentially in the same plane as said face of said monitor.

19. The apparatus of claim 1, further comprising a second said speaker and a second said coupling.

20. The apparatus of claim 1, further comprising a resilient bumper disposed between said speaker and said monitor.

21. The apparatus of claim 20, wherein said resilient bumper is coupled to said speaker.

22. The apparatus of claim 21, wherein said speaker comprises a recess in which said resilient bumper is partially disposed.

23. The apparatus of claims 20, wherein said resilient bumper is coupled to said monitor.

24. The apparatus of claim 23, wherein said monitor comprises a recess in which said resilient bumper is partially disposed.

25. A method of attaching a speaker to a monitor, comprising:

holding said speaker near said monitor;

lowering said speaker in a direction that is at an angle to vertical; and engaging a coupling along a vertical crease of said monitor, said vertical crease being located between a bezel surrounding a face of said monitor and a smaller rear enclosure, said coupling including a projecting element on either said monitor or said speaker and a receiving element on the other of said monitor or said speaker.

26. A monitor, comprising:

a housing having a bezel surrounding a face of said monitor and a smaller rear enclosure which meets a rear surface of said bezel along a vertical crease; and a pair of projecting elements protruding at an acute angle to vertical within said vertical crease for coupling detachably a speaker.

27. The monitor of claim 26, wherein said pair of projecting elements comprises two pairs of said projecting elements, each of said pairs protruding within a vertical crease on respectively opposite sides of said housing.

28. A speaker for a computer, comprising:

a housing having a first and a second surface respectively complimentary to a bezel surrounding a face of and a rear enclosure of a monitor; and a pair of receiving elements receding at an acute angle to vertical into said housing at an intersection of said first and second surfaces, said receiving elements configured for coupling detachably to said monitor.

29. The speaker of claim 28, wherein said component comprises a monitor.

30. The speaker of claim 28, wherein said first and second surfaces are arcuate and straight, respectively.

31. An apparatus, comprising:

a monitor having bezelled and flat surfaces;

a speaker having surfaces complimentary to said bezelled and flat surfaces;

a coupling including a first member disposed at an intersection of said bezelled and flat surfaces of said monitor and a second member disposed at an intersection of said complimentary surfaces of said speaker, said coupling being configured to hold detachably said speaker on said monitor by a gravitational force acting on said speaker and to maintain said complimentary surfaces flush with said bezelled and flat surfaces.

* * * * *